(12) United States Patent
Bishop

(10) Patent No.: US 7,475,528 B2
(45) Date of Patent: Jan. 13, 2009

(54) MACHINE FOR REMOVING VEGETATION

(76) Inventor: John Robert Bishop, 6 The Hummicks, Beaulieu, Hampshire (GB) SO42 7YU ( * ) Notice: Subject to any disclaimer, the term of this patent is extended or adjusted under 35 U.S.C. 154(b) by 138 days.

(21) Appl. No.: 10/543,855

(22) PCT Filed: Jan. 27, 2004

(86) PCT No.: PCT/GB2004/000332

§ 371 (c)(1),
(2), (4) Date: Jul. 28, 2005

(87) PCT Pub. No.: WO2004/066712

PCT Pub. Date: Aug. 12, 2004

(65) Prior Publication Data

US 2006/0144030 A1 Jul. 6, 2006

(30) Foreign Application Priority Data

Jan. 31, 2003 (GB) ................................. 0302370.2
Dec. 8, 2003 (GB) ................................. 0328378.5

(51) Int. Cl.
*A01D 46/00* (2006.01)
(52) U.S. Cl. ................ 56/11.1; 56/12.5; 56/12.9; 56/13.3; 15/349; 15/352

(58) Field of Classification Search ............... 56/12.9, 56/13.3, 13.4, 11.1, 12.5, 13.1, 16.6, 202; 15/340.2, 340.3, 349, 352; *A01D 46/00*
See application file for complete search history.

(56) References Cited

U.S. PATENT DOCUMENTS 2,460,029 A * 1/1949 Ramp .......................... 56/13.2
6,052,973 A * 4/2000 Tsuchihashi et al. ............. 56/7

* cited by examiner

*Primary Examiner*—David A Redding

(57) ABSTRACT

A lawncare machine 100 has a powered rotary raking or scarifying reel 5 together with a powered vacuum collector 8 whereby material thrown up by the reel is immediately drawn into the collection chamber 8. During removal of the vegetation material, it is drawn into the chamber 8 due to a suction created by a fan 2. The material is normally held in the box by means of a perforated screen 10 situated between the box and fan entry. The chamber 8 may be emptied by moving the screen 10 so that the material is discharged through the fan 2.

Alternatively the chamber 8 may be emptied by means of flap valves 19, 21, 23 which cause a reversal of the airflow through the chamber so that the collected material never passes through the fan.

13 Claims, 3 Drawing Sheets

MACHINE FOR REMOVING VEGETATION

The maintenance of lawns to a reasonable standard requires occasional raking or scarifying to remove moss and thatch. Additionally it is necessary to collect the raked moss or thatch and also mowings and leaves. There already exist machines which carry out the raking and scarifying duty but these are not good at collection. There also exist vacuum collectors which perform the duty of collecting loose material such as dry leaves but these will not remove moss or thatch or leaves that are embedded in the grass. It would clearly be advantageous if a machine were available that can perform the tasks of both raking and vacuum collection efficiently and simultaneously.

According to the invention, a machine for removing vegetation comprises a rotable reel, power means for rotating the reel, a collection chamber for receiving material removed by rotation of the reel, fan means for generating a vacuum in the collection chamber, and means for employing the fan means so as to assist the emptying of the material from the collection chamber.

As used herein, the term "vacuum" means sub ambient pressure.

Also, as used herein, the term "reel" includes both a raking reel and a scarifying reel.

In addition, as used herein, reference to removal of vegetation includes scarifying or raking of vegetation.

The various aspects of the invention will now be described by way of example only with reference to the accompanying drawings wherein.

Figure 1:
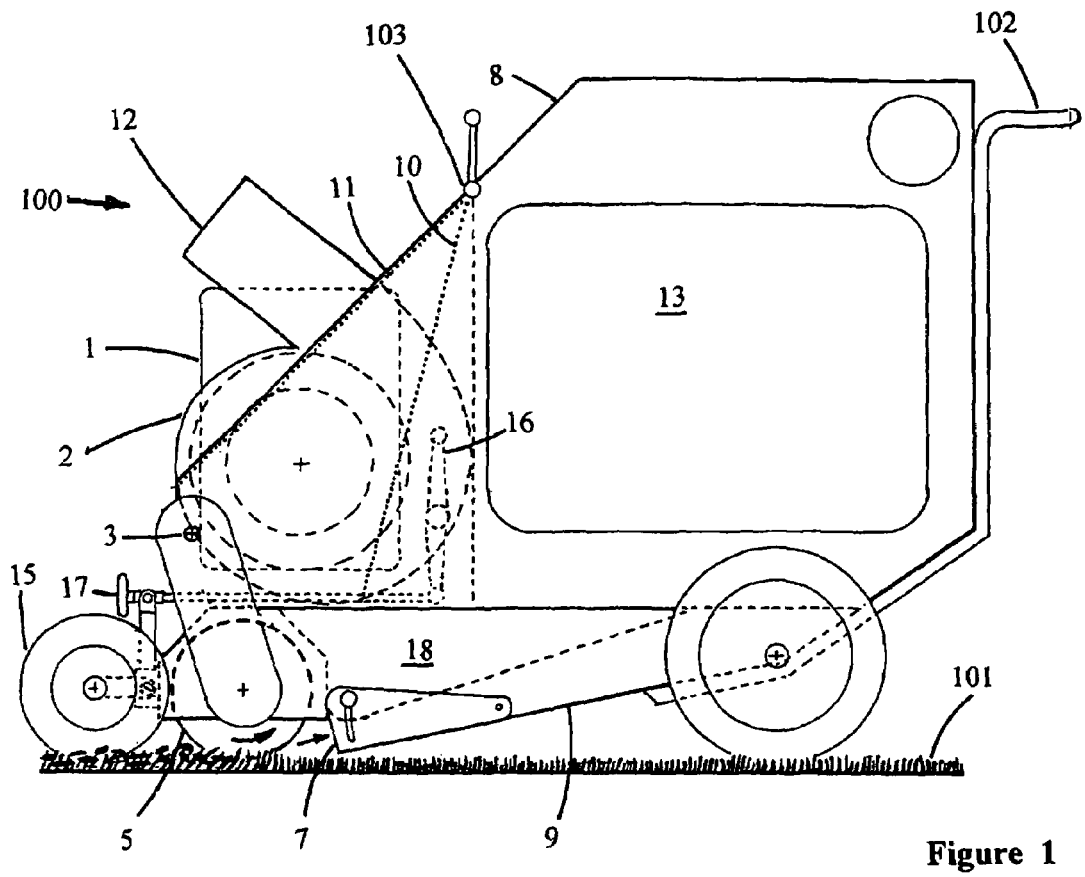
FIG. 1 is a side view of a machine for removing vegetation.
Figure 2:
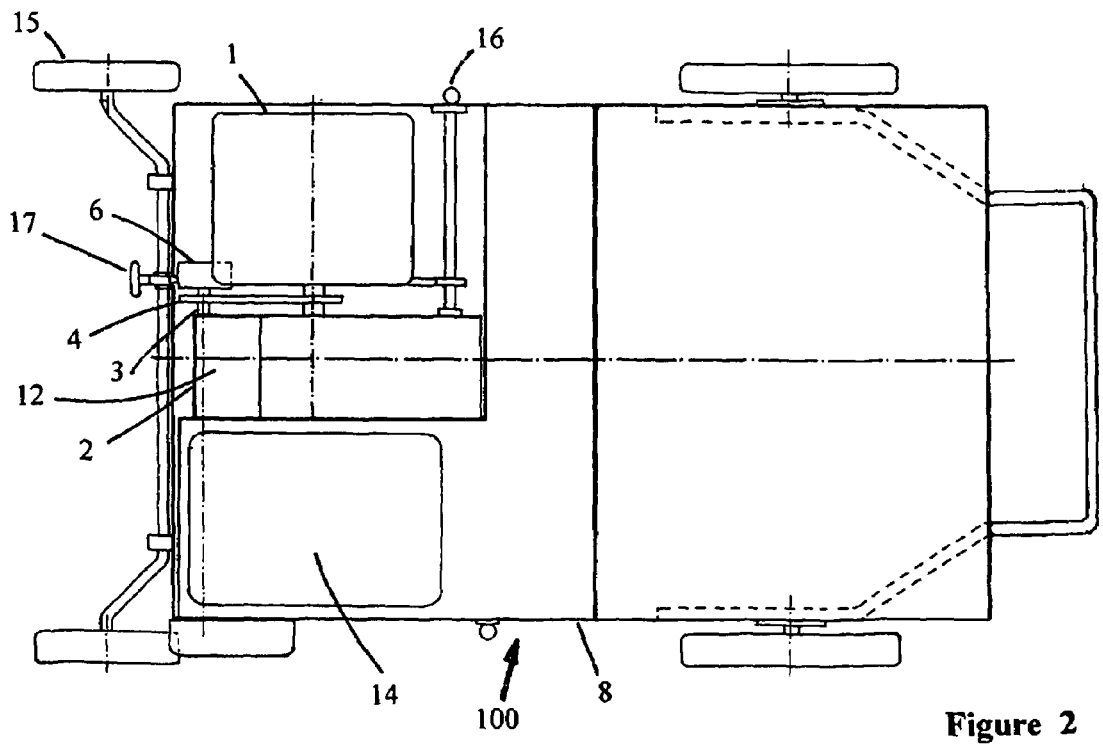
FIG. 2 is a plan view of the machine.
Figure 3:
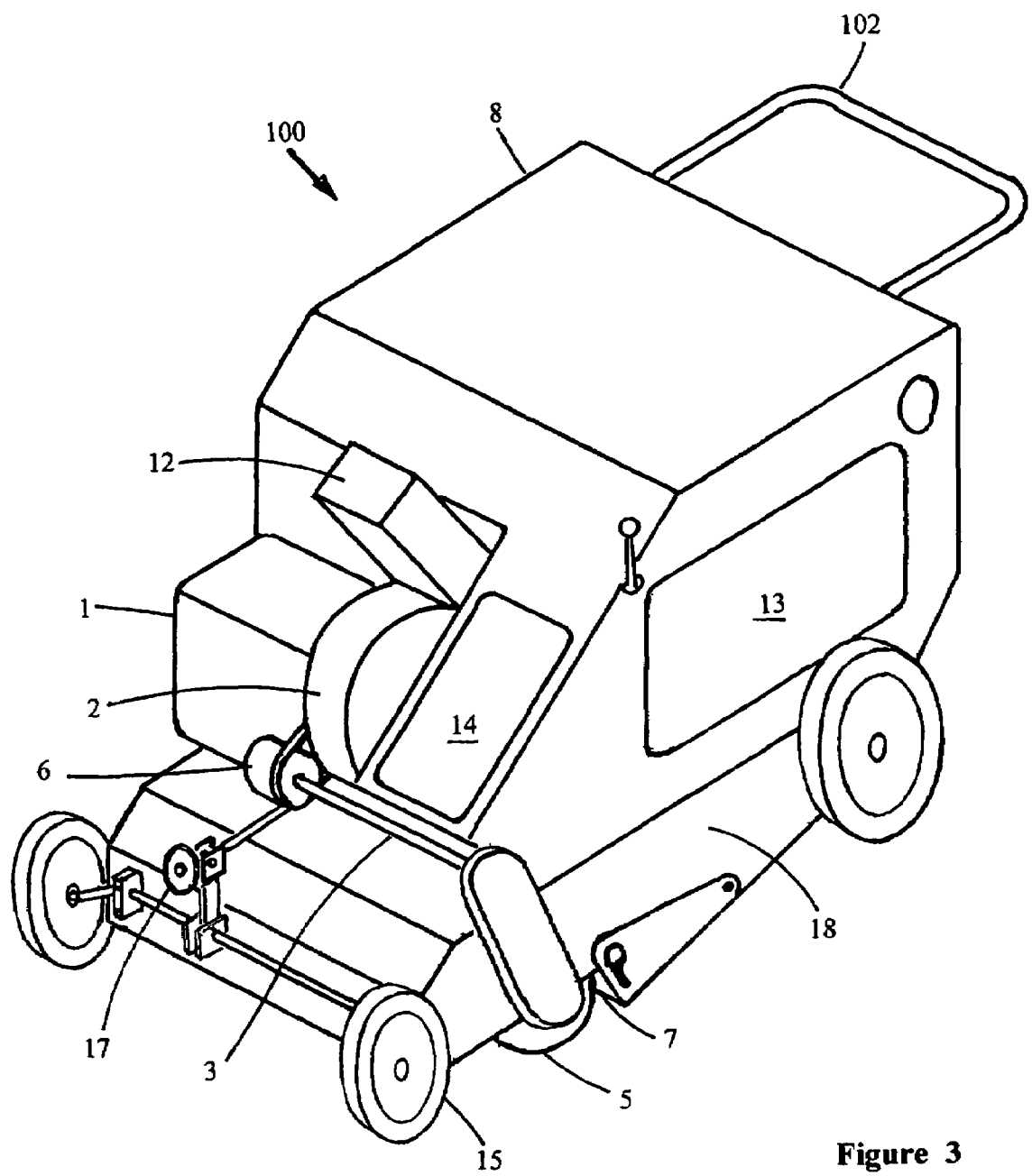
FIG. 3 is a perspective view of the machine.

With reference to FIGS. 1, 2 and 3, a machine 100 for removing vegetation from a ground surface 101 comprises a rotable reel 5, power means in the form of a power unit 1, a collection chamber 8 for receiving material thrown up by the reel 5, and fan means 2 for generating a sub-ambient vacuum in the collection chamber 8, so as to induce removed vegetation material to enter the collection chamber.

The power unit 1, which preferably comprises an internal combustion engine, the output of which is variable, drives the fan 2 and a layshaft 3. The layshaft 3 may be driven by a belt or a chain 4. The rotary reel 5 is driven by the layshaft 3 via a clutch 6. It will be appreciated that the layshaft 3 may also be used to drive the ground wheels 15 via a second clutch (not shown). Alternatively the power transmission to the reel 5 and the ground support wheels 15 may be by other means such as a hydraulic pump and motors.

The machine 100 is provided with handles 102 for manoeuvring the machine over the ground surface 101.

The rotary reel 5 throws up removed material into the intake 7 of the vacuum collector 8. This intake is disposed adjacent the ground surface 101 and is adjustable towards and away from the surface and/or spring loaded into the down position. The removed vegetation is drawn into the collection chamber 8 via a duct or diffuser 9 forming an extension of the intake 7. Air is drawn from the collection chamber 8 by means of the fan 2 in order to generate a vacuum therein. The removed material is held in the collection chamber 8 because of the presence of a perforated screen 10, positioned as shown. The screen 10 provides the machine 100 with means of employing the fan 2 so as to assist the emptying of the gathered material from the chamber 8. The screen 10 is pivotally mounted at 103 so that it is movable between a first position whereby it retains gathered vegetation material within the collection chamber 8, and a second position (shown at 11), whereby it allows the material to be drawn out of the collection chamber 8 by the fan 2. When it is desired to empty the collection chamber 8, the screen 10 is moved to the position 11 so that the collected material may then be drawn out of the chamber 8 to be discharged through the fan outlet 12. A door 13 in the collection chamber 8, may be constructed in a transparent material so that it can be seen when the chamber needs emptying. A further door 14 is provided so that the screen 10 and the entry of the fan means 2 can be cleaned. It will be appreciated that the opening of the door 14 whilst the fan is running will assist cleaning of the screen 10 because of reverse air flow through the screen 10 when it is in position 11.

The height of the ground wheels 15 and hence the height of the rotary reel 5 above the ground surface 101 is adjustable by means of a lever 16 and suitable linkages and via a handwheel 17. The handwheel 17 provides a means of fine adjustment of the height of the ground wheels 15. This height is also adjustable by means of a notched adjuster (not shown) at the lever 16 in specific repeatable positions. It will be appreciated that when moving the machine 100 to an emptying place the rotary reel 5 can be lifted clear of the ground but subsequently reset for raking or scarifying by means of the notched adjuster in a repeatable manner.

The collection chamber 8 is easily demountable from the machine chassis 18 and the machine 100 can then be used for raking or scarifying without collection. In this case the material may be discharged beneath the chassis 18, with the collector intake 7 in a raised position.

The power to the fan 2 varies approximately with the cube of its rotational speed whereas the power to the reel 5 varies approximately linearly with its speed in given conditions. For example, the differing nature of vegetation. Consequently high engine speed settings will give correspondingly more power to vacuum collection and therefore the speed settings can be used to vary the emphasis on raking or collection. The rotary reel 5 has sprung raking teeth, but may alternatively be replaced by a reel having thin blades for scarifying purposes.

It will be appreciated that, during material collection, the airflow and consequently the fan rotational speed need to be set at a high value to ensure efficient collection.

However, during the emptying process when, as described, the screen 10 is moved to position 11 so as to allow the collected material to be discharged through the fan 2 the fan speed may be set to a lower value. An advantageous consequence is that as the collected material does not pass through the fan during collection there will be substantially no problem with fan blade erosion or other damage. When emptying, although the collected material does pass through the fan 2, the reduced fan speed at this time will minimise blade erosion. In existing designs of vacuum collectors where the ingested material passes through the fan during collection there often arise severe problems with fan erosion or damage, which may seriously put the fan out of balance.

Figure 4:
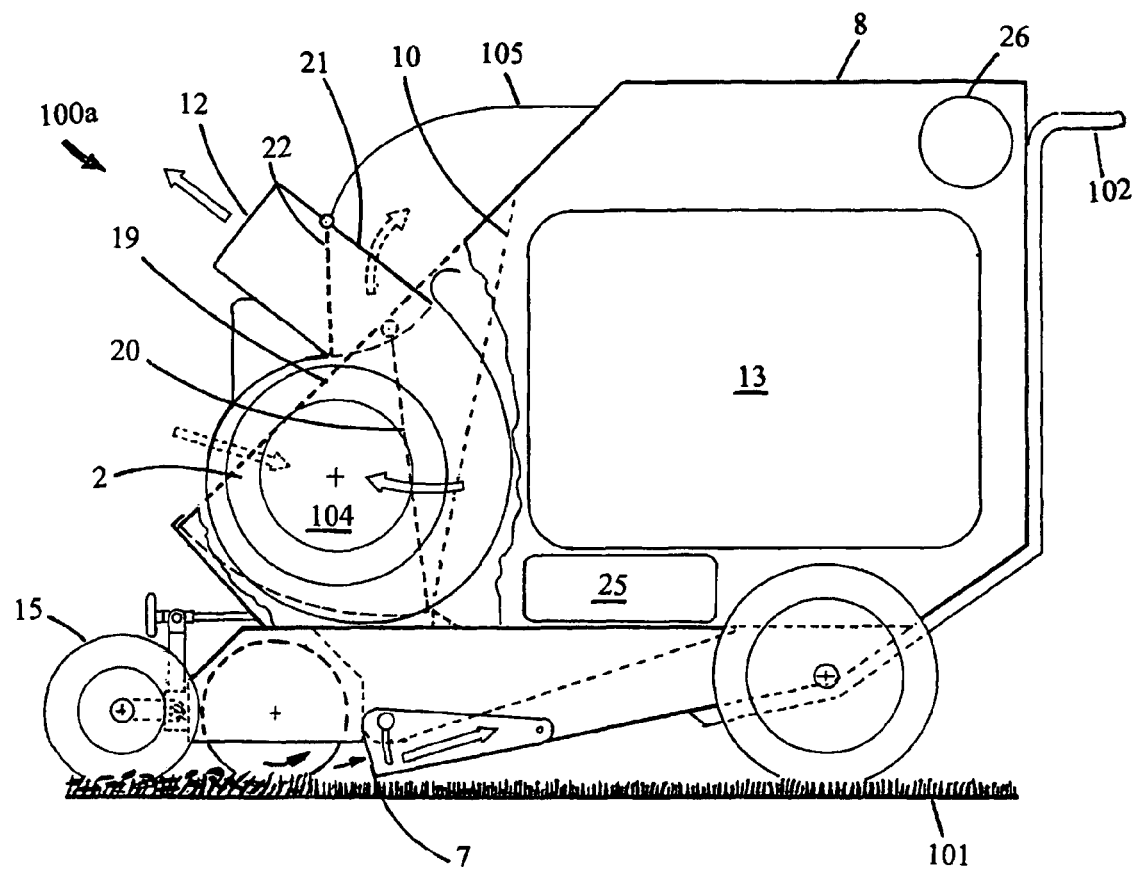
FIG. 4 is a side view of a modified machine with reverse flow emptying of removed vegetation.

Alternatively the machine can be configured so that the collected material never passes through the fan 2 even during the emptying process, yet still retaining the advantage of powered emptying employing the fan 2. This design is illustrated by FIG. 4. Here, the screen 10 of the machine 100*a* is not movable. During material collection the airflows are indicated by the solid arrows, namely through the collector intake 7, through the collection chamber 8, through the perforated screen 10 and through the fan 2 discharging to atmosphere at 12. For powered emptying there are a number of airflow control valves operable so that the fan airflow is caused to discharge, by way of reverse airflow, into the collection chamber 8, whereby gathered material is caused to leave the collection chamber 8 by way of a bottom-disposed outlet 25, under the influence of said overflow. The airflow control valves comprise pivotally mounted flap valves 19, 21 and 23. The first valve 19 is normally positioned so that the fan means 2 causes induction of the gathered vegetation material into the collection chamber 8. However, to achieve reverse flow it is pivoted to position 20 whereby the inlet 104 of the fan means 2 is exposed to atmosphere. The second valve 21 is simultaneously pivoted to position 22 so that the fan means 2 discharges into a duct 105 forming part of the collection chamber 8, instead of to atmosphere.

Figure 5:
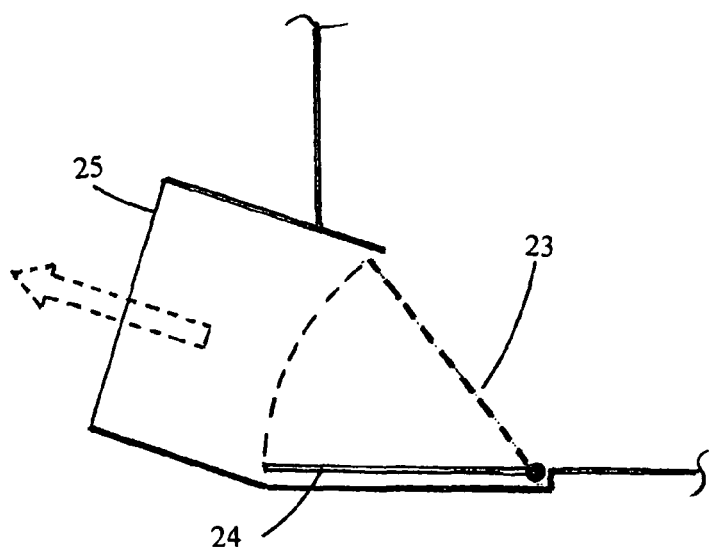
FIG. 5 is a side view of the outlet port 25 of FIG. 4, at enlarged scale with added detail.

The third valve 23 (FIG. 5) is opened to position 24 whereby gathered material leaves the bottom of the collection chamber 8 by way of the discharge duct 25. Meanwhile, the collection chamber intake 7 is moved to an upper or closed position to prevent discharge of material through the intake. The airflow during the emptying process is indicated by the dotted arrows. Some or all of the movable valves 19, 21, 23 may be actuated together by rods or cables to simplify the change over from collection to emptying. Alternatively the valves may be hydraulically, pneumatically or electrically actuated. A rigid or flexible duct, not illustrated, can be attached to the bottom outlet 25 to assist discharge of the collected material onto a heap or onto a vehicle for transport away. The duct may be the same as that which may be used to draw material into the collection chamber 8 via a valved inlet 26.

FIGS. 1 to 5 illustrate "walk-behind" machines. It will be appreciated however that the principles of the invention can also be applied to "ride-on" or "tractor-pulled" machines.

The invention claimed is:

1. A machine for removing vegetation, comprising a rotatable reel, power means for rotating the reel, a collection chamber for receiving material removed by rotation of said reel, and fan means situated downstream of the collection chamber for generating a vacuum in the collection chamber thereby causing an airflow which draws said material thrown up by the reel into the collection chamber and where said material is retained in the collection chamber by means of a perforated screen situated between the said collection chamber and an entry to the said fan means, wherein the perforated screen means acts as a valve movable between a first collection position whereby it retains gathered material within the collection chamber and a second emptying position whereby it allows said material to be discharged from the collection chamber by the said fan means.

2. A machine for removing vegetation, comprising a rotatable reel, power means for rotating the reel, a collection chamber for receiving material removed by rotation of said reel, and fan means situated downstream of the collection chamber for generating a vacuum in the collection chamber thereby causing an airflow which draws said material thrown up by the reel into the collection chamber and where said material is retained in the collection chamber by means of a perforated screen situated between the said collection chamber and an entry to the said fan means, the machine being provided with airflow control valves operable so that the fan means cause, by way of reverse airflow, the collected material to leave the said collection chamber through an exit aperture.

3. A machine as claimed in claim 1 provided with a door providing access to the collection chamber whereby, with the door open, the fan means operating and with the screen means disposed in the second position, reverse air flow through the screen means assists cleaning of the screen means.

4. A machine as claimed in any one of claims 1 to 3, provided with control means whereby a rotational speed of the power means is variable so as to alter the proportions of power absorbed by the said rotatable reel in relation to that absorbed by the said fan means.

5. A machine as claimed in claim 2 wherein said airflow control valves comprise a first valve operable to cease induction of vegetation into the collection chamber and instead expose the inlet of the said fan means to the atmosphere, a second valve operable to divert the discharge of the fan means to the collection chamber instead of to the atmosphere, and a third valve operable to allow the gathered material to leave the collection chamber through the said exit aperture.

6. A machine as claimed in claim 5, wherein one or more of the airflow control valves comprise pivotally mounted flap valves movable between two positions.

7. A machine for removing lawn moss, lawn thatch, lawn mowings or leaves from a lawn, the machine comprising:
   a rotatable raking or scarifying reel;
   means for supporting the reel for movement across the lawn so that the reel engages the lawn;
   power means for rotating the reel so that the reel rakes or scarifies the lawn;
   a collection chamber for receiving material removed by rotation of said reel;
   fan means; and
   a perforated screen;
   wherein the machine is operable in a collection mode in which the fan means is operable to draw air from the collection chamber through the perforated screen so that material which is thrown up by the reel is drawn into the collection chamber but is prevented by the perforated screen from being drawn from the collection chamber through the fan means.

8. A machine as claimed in claim 7, wherein the machine is selectably and alternatively operable in an emptying mode in which the fan means is operable to draw air from the collection chamber without passing through the perforated screen so that material in the collection chamber is drawn through the fan means.

9. A machine as claimed in claim 8, wherein the machine is changeable between its collection and emptying modes by moving the perforated screen.

10. A machine as claimed in claim 8, wherein the machine is selectably and alternately operable in a screen-cleaning mode in which the fan means is operable to draw air through the screen in the opposite direction to the direction in which air is drawn through the screen in the collection mode.

11. A machine as claimed in claim 7., wherein the machine is selectably and alternatively operable in an emptying mode in which the fan means is operable to pressurize the collection chamber, the collection chamber having an discharge outlet which can be opened to allow air and material in the pressurized collection chamber to escape.

12. A machine as claimed in claim 11, further including a plurality of valves, and wherein the machine is changeable between its collection and emptying modes by operating the valves, so that in the collection mode the direction of airflow is from the collection chamber through the perforated screen and then into an inlet of the fan means and then out of an outlet of the fans means to the atmosphere, and so that in the emptying mode the direction of air flow is from the atmosphere into the inlet of the fan means, and then from the outlet of the fan means through the collection chamber and then through the discharge outlet.

13. A machine as claimed in any one of claims 7 to 12, wherein the fans means is arranged to be driven by the power means, and further including control means for varying the rotational speed of the power means so as to alter the proportion of power absorbed by the reel in relation to that absorbed by the said fan means.

* * * * *